U S009404573B2

(12) United States Patent
Hand et al.

(10) Patent No.: US 9,404,573 B2
(45) Date of Patent: Aug. 2, 2016

(54) HYDROMECHANICAL POWER MANAGEMENT OF FIXED DISPLACEMENT BOOST PUMPS

(71) Applicant: Caterpillar Inc., Peoria, IL (US)

(72) Inventors: Timothy Hand, Metamola, IL (US);
Ryan Harken, Dunlap, IL (US); Robert Jackson, Edwards, IL (US); David Guetschow, East Peoria, IL (US);
Jeffrey Jones, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 599 days.

(21) Appl. No.: 13/874,955

(22) Filed: May 1, 2013

(65) Prior Publication Data

US 2014/0325971 A1 Nov. 6, 2014

(51) Int. Cl.
*F16D 31/02* (2006.01)
*F16H 61/4139* (2010.01)

(52) U.S. Cl.
CPC ... *F16H 61/4139* (2013.01); *F15B 2211/20576* (2013.01); *F15B 2211/20584* (2013.01)

(58) Field of Classification Search
CPC ............. F15B 2211/20584; F15B 2211/20592
See application file for complete search history.

(56) References Cited

U.S. PATENT DOCUMENTS

| 5,527,507 A * | 6/1996 | Childers ................. A61L 2/208 422/28 |
| 2012/0317964 A1 | 12/2012 | Demick et al. |
| 2013/0074486 A1* | 3/2013 | McWethy ............... E02F 3/964 60/428 |

FOREIGN PATENT DOCUMENTS

| JP | 2004-204985 A | 7/2004 |
| JP | 2011-241947 A | 12/2011 |

OTHER PUBLICATIONS

United States Statutory Invention Registration, US H1977 H, Inventor Bryan G. Poorman, Published Aug. 7, 2001.

* cited by examiner

*Primary Examiner* — Nathaniel Wiehe
*Assistant Examiner* — Daniel Collins
(74) *Attorney, Agent, or Firm* — Edward Y. Lin (57) ABSTRACT

A hydraulic apparatus and a method of controlling the hydraulic apparatus are disclosed. The hydraulic apparatus includes a first pump having a first fixed displacement, a second pump having a second fixed displacement, and a diverter. The diverter includes a first diverter inlet port fluidly coupled to a discharge of the second pump, a first diverter outlet port fluidly coupled to a discharge of the first pump, and a second diverter outlet port fluidly coupled to a low pressure system, the low pressure system having a fluid pressure lower than a fluid pressure of the discharge of the first pump. The diverter is operable to selectively vary fluid communication between the first diverter inlet port and either the first diverter outlet port or the second diverter outlet port based on a reference pressure.

4 Claims, 6 Drawing Sheets

HYDROMECHANICAL POWER MANAGEMENT OF FIXED DISPLACEMENT BOOST PUMPS

TECHNICAL FIELD

The disclosure relates generally to hydraulic pressure control in hydraulic systems, and more particularly, to apparatus and methods for controlling pressure in hydraulic systems including two fixed displacement boost pumps.

BACKGROUND

Hydraulic systems are known for converting fluid energy, for example, fluid pressure, into mechanical energy. Fluid power may be transferred from a hydraulic pump through fluid conduits to one or more hydraulic actuators. Hydraulic actuators may include hydraulic motors that convert fluid power into shaft rotational power, hydraulic cylinders that convert fluid power into translational motion, or the like.

Some hydraulic systems may include a hydrostatic closed-loop, having a pump coupled to a hydraulic motor through a motor supply conduit and a pump return conduit, such that all of the hydraulic fluid is not returned to a reservoir upon each pass through the closed-loop. But even in so-called closed-loop systems, fluid may leak out of the closed-loop during operation, or be deliberately flushed from the closed-loop to a reservoir to control a hydraulic fluid property such as temperature, viscosity, cleanliness, or the like. Thus, operation of hydrostatic closed-loop systems may benefit from replacement of lost hydraulic fluid during operation.

Hydraulic boost circuits have been proposed to supply makeup hydraulic fluid flow or boost flow to a hydrostatic closed-loop circuit. Some boost circuits employ a single fixed displacement pump coupled to a hydrostatic closed-loop hydraulic circuit to make up lost fluid. However, such systems may lack flexibility in tailoring pump output to boost needs over an operating range. As a result, single fixed displacement boost pumps may provide inadequate flow in some circumstances and excess flow in other circumstances.

Alternatively, boost circuits including a variable displacement boost pump have been proposed to vary the amount of hydraulic fluid makeup flow to the closed-loop at any given time by varying pump displacement. However, variable displacement boost pumps may be prohibitively expensive, large in size, or both.

Japanese Patent Publication 2004-204985 (JP '985), entitled "Flow Rate Backup Circuit to HST Circuit," purports to address the problem of fixed displacement hydraulic pump flow utilization. The JP '985 publication describes a first fixed displacement pump that supplies flow to a hydrostatic transmission (HST), and a second fixed displacement pump that supplies flow to a work machine actuator or to the HST depending on vehicle rolling speed. However, the JP '985 publication still may not enable tailoring of boost pressure at a confluence of multiple fixed displacement boost pumps.

Accordingly, there is a need for improved apparatus and methods for controlling hydraulic boost circuits at low cost and within space requirements.

SUMMARY

In one aspect, the disclosure describes a hydraulic apparatus. The hydraulic apparatus includes a first pump having a first fixed displacement, a second pump having a second fixed displacement, and a diverter. The diverter includes a first diverter inlet port fluidly coupled to a discharge of the second pump, a first diverter outlet port fluidly coupled to a discharge of the first pump, and a second diverter outlet port fluidly coupled to a low pressure system, the low pressure system having a fluid pressure lower than a fluid pressure of the discharge of the first pump. The diverter is operable to selectively vary fluid communication between the first diverter inlet port and either the first diverter outlet port or the second diverter outlet port based on a reference pressure, the reference pressure being a fluid pressure in a conduit downstream of the discharge of the first pump, such that the diverter effects fluid communication between the first diverter inlet port and the second diverter outlet port when the reference pressure is greater than a first pressure setpoint.

In another aspect, the disclosure describes a hydrostatic closed-loop system. The hydrostatic closed-loop system includes a first pump having a first fixed displacement, a second pump having a second fixed displacement, a third pump coupled a hydraulic motor via a hydrostatic closed-loop conduit; and a diverter. The diverter includes a first diverter inlet port fluidly coupled to a discharge of the second pump, a first diverter outlet port fluidly coupled to a discharge of the first pump, and a second diverter outlet port fluidly coupled to a low pressure system, the low pressure system having a fluid pressure lower than a fluid pressure of the discharge of the first pump. The diverter is operable to selectively vary fluid communication between the first diverter inlet port and either the first diverter outlet port or the second diverter outlet port based on a reference pressure, the reference pressure being a fluid pressure in a conduit downstream of the discharge of the first pump, such that the diverter effects fluid communication between the first diverter inlet port and the second diverter outlet port when the reference pressure is greater than a first pressure setpoint.

In yet another aspect, the disclosure describes a method of controlling a hydraulic pressure in a hydraulic system. The method includes driving a first pump having a first fixed displacement, driving a second pump having a second fixed displacement, diverting a first flow from a discharge of the second pump to a low pressure system when a reference pressure is greater than a first pressure setpoint, and diverting a second flow from the discharge of the second pump to a conduit receiving a third flow from a discharge of the first pump when the reference pressure is not greater than a second pressure setpoint. The reference pressure is a fluid pressure in the conduit receiving the third flow from the discharge of the first pump, the low pressure system having a fluid pressure lower than a fluid pressure of the discharge of the first pump.

DETAILED DESCRIPTION

In the following description, like reference numbers refer to like elements throughout, unless otherwise specified.

Figure 1:
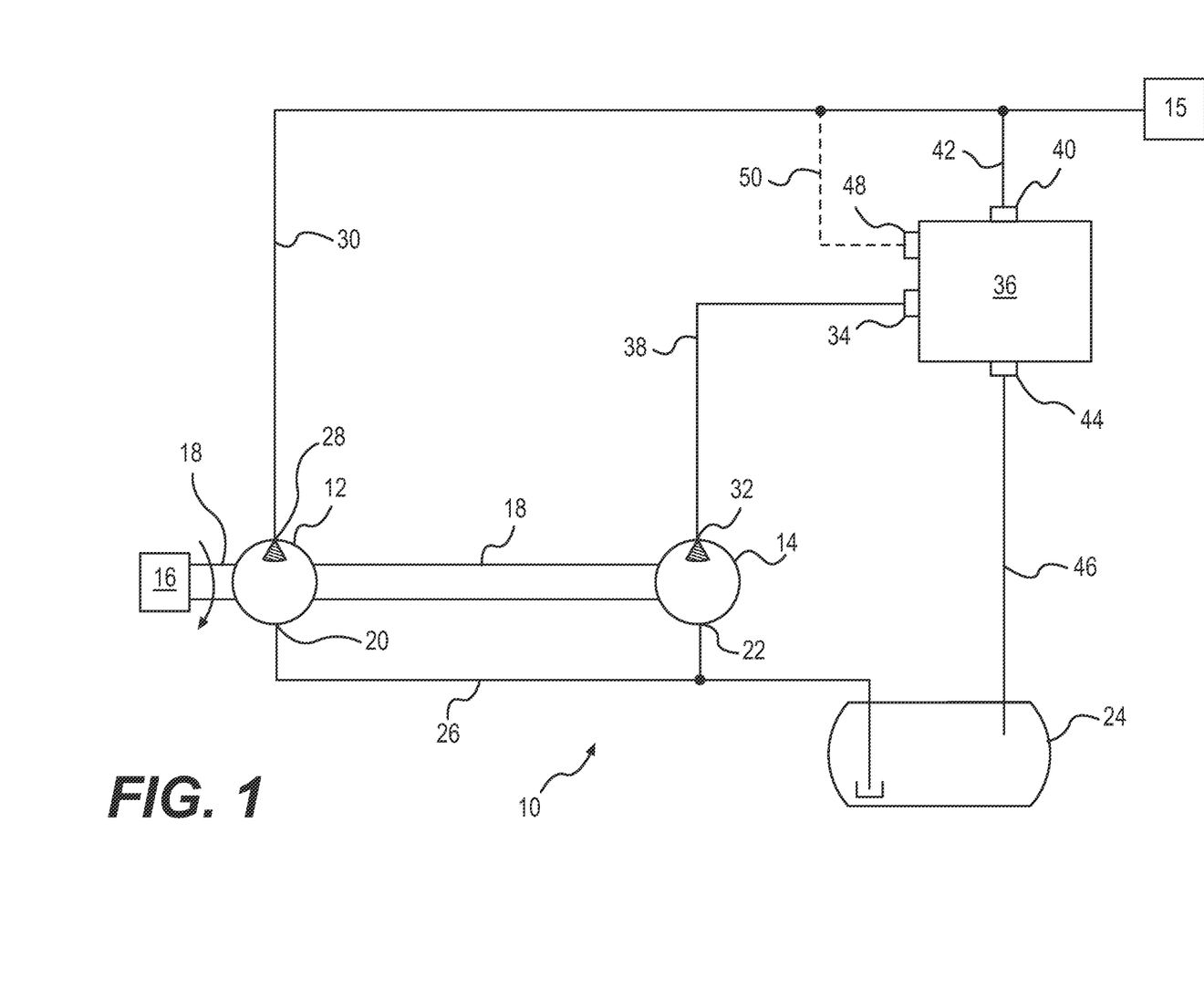
FIG. 1 is a schematic diagram of a hydraulic system according to an aspect of the disclosure.

FIG. 1 is a schematic diagram of a hydraulic system 10 according to an aspect of the disclosure. The hydraulic system 10 includes a first pump 12 and a second pump 14 that supply pressurized hydraulic fluid to a machine 15. The first pump 12 and the second pump 14 may each have a fixed displacement, such that a volumetric flow rate of each of the first pump 12 and the second pump 14 is substantially determined by a rotational speed of a drive shaft 18. The fixed displacement of the first pump 12 may be the same or different from the fixed displacement of the second pump 14. Alternatively, it will be appreciated that either the first pump 12 or the second pump 14 could have a variable displacement.

The machine 15 could be any machine or device that utilizes pressurized hydraulic fluid such as, for example, a boost or charge system for a hydrostatic closed-loop hydraulic system, a pilot system for effecting hydraulic control, a hydraulic actuator such as a hydraulic cylinder, a hydraulic motor, or other hydraulic actuator known to persons having ordinary skill in the art, or combinations thereof. Further, the machine 15 could be an "over-the-road" vehicle such as a truck used in transportation or may be any other type of machine that performs some type of operation associated with an industry such as mining, construction, farming, transportation, or any other industry known in the art.

Alternatively, the machine 15 may be an off-highway truck, earth-moving machine, such as a wheel loader, excavator, dump truck, backhoe, motor grader, material handler or the like. The term "machine" can also refer to stationary equipment such as a generator that is driven by a shaft power source, a chemical power source, or other power source known to persons having ordinary skill in the art. Further, the term "machine," in other aspects, is or is part of any device using a hydraulic circuit.

Figure 6:
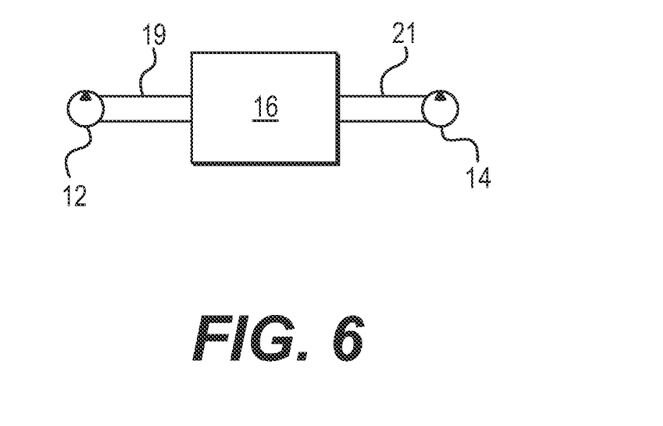
FIG. 6 is a schematic diagram of two pumps coupled to a single prime mover, according to an aspect of the disclosure.

Although FIG. 1 shows both the first pump 12 and the second pump 14 coupled to a common prime mover 16 through a common drive shaft 18, it will be appreciated that the first pump 12 and the second pump 14 could be coupled to separate prime movers through separate shafts, or to the same prime mover through separate shafts. For example, as shown in FIG. 6, the first pump 12 may be driven by the prime mover 16 via a first drive shaft 19, and the second pump 14 may be driven by the prime mover 16 via a second drive shaft 21, such that the first drive shaft 19 may be the same as or different from the second drive shaft 21.

Figure 7:
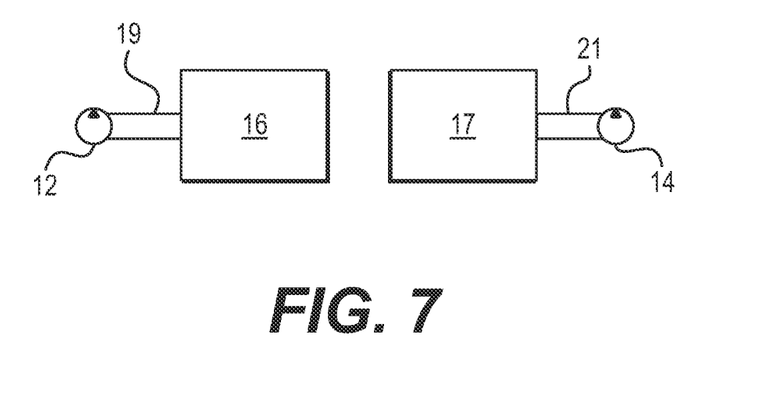
FIG. 7 is a schematic diagram of two pumps separately coupled to two prime movers, according to an aspect of the disclosure.

Alternatively, as shown in FIG. 7, the first pump 12 may be driven by a first prime mover 16 via a first drive shaft 19, and the second 14 may be driven by a second prime mover 17 via a second drive shaft 21. Prime movers for supplying shaft power to either the first pump 12 or the second pump 14 may include, for example, reciprocating combustion engines such as spark ignition engines or Diesel engines; gas turbines; air or wind turbines; steam turbines; or other sources of shaft power known to persons having ordinary skill in the art.

An intake 20 of the first pump 12 and an intake 22 of the second pump 14 may draw hydraulic fluid from a reservoir 24 through an intake conduit 26. Alternatively, the first pump 12 and the second pump 14 may draw hydraulic fluid from separate reservoirs through separate conduits, or other sources of hydraulic fluid known to persons having ordinary skill in the art.

A discharge 28 of the first pump 12 is fluidly coupled to the machine 15 via a first supply conduit 30, and a discharge 32 of the second pump 14 is fluidly coupled to a first inlet port 34 of a diverter 36 via a second supply conduit 38. A first outlet port 40 of the diverter 36 may be fluidly coupled to the machine 15 via a first outlet conduit 42 and the first supply conduit 30. A second outlet port 44 of the diverter 36 may be fluidly coupled to the reservoir 24, or any other low pressure system having a pressure lower than a pressure inside the diverter 36, via a second outlet conduit 46. A second inlet port 48 of the diverter 36 may also be fluidly coupled to the discharge 28 of the first pump 12 via a second inlet conduit 50 and the first supply conduit 30.

The second inlet conduit 50 may be configured to deliver small, pilot-scale flow from the first supply conduit 30 to the diverter 36, as represented by the dashed line in FIG. 1. As such, flow through the second inlet conduit 50 may not significantly affect the pressure in the first supply conduit 30, other than by effecting control action of the diverter 36. Unless otherwise specified, fluid conduits represented by dashed lines in the drawings may be configured for only pilot-scale flows.

In one aspect of the disclosure, the diverter 36 may be operable to direct a flow from the discharge 32 of the second pump 14 to the machine 15 via the first outlet port 40 when a pressure within the diverter 36 is less than a first pressure setpoint. In another aspect of the disclosure, the diverter 36 may be operable to direct a flow from the discharge 32 of the second pump 14 to the reservoir 24 via the second outlet port 44 when a pressure within the diverter 36 is not less than a second pressure setpoint. In yet another aspect of the disclosure, the first pressure setpoint may be substantially equal to the second pressure setpoint. Thus, the diverter 36 may selectively direct flow from the second pump 14 to either the machine 15 or the reservoir 24 based on a pressure within the diverter 36.

Accordingly, fluid pressure to the machine 15 may be increased when the diverter 36 increases a fraction of flow from the second pump 14 into the first supply conduit 30. Alternatively, fluid pressure to the machine 15 may be decreased when the diverter 36 increases a fraction of flow from the second pump 14 to the reservoir 24. Thus, the diverter 36 may control the fluid pressure within first supply conduit 30. It will be appreciated that the diverter 36 may act to toggle the entire discharge flow from the second pump 14 between the first supply conduit 30 and the second outlet conduit 46, or the diverter 36 may act to proportionally direct a fraction of the second pump 14 discharge flow between the first supply conduit 30 and the second outlet conduit 46.

Figure 2:
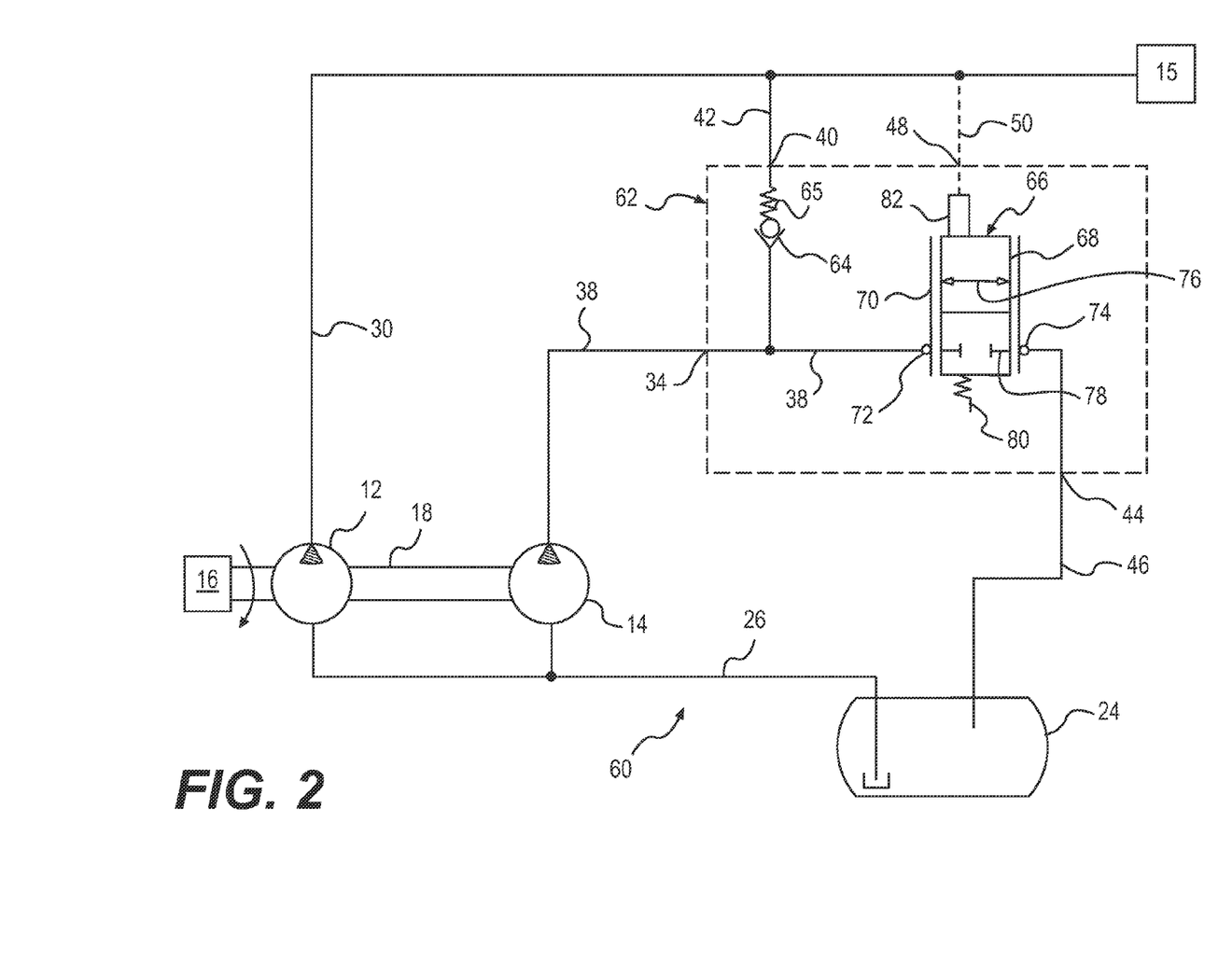
FIG. 2 is a schematic diagram of a hydraulic system according to an aspect of the disclosure.

FIG. 2 is a schematic diagram of a hydraulic system 60 according to an aspect of the disclosure. Similar to FIG. 1, the hydraulic system 60 includes a first pump 12 and a second pump 14 to draw hydraulic fluid from a reservoir 24 and deliver the hydraulic fluid to a machine 15 via a first supply conduit 30. However, the hydraulic system 60 further includes a diverter 62 having a check valve 64 and a relief valve 66.

The check valve 64 may be disposed in the first outlet conduit 42 extending between the second supply conduit 38 and the first supply conduit 30, and effect fluid communication therebetween. The check valve 64 is oriented such that it allows flow only in a direction from the second supply conduit 38 toward the first supply conduit 30. Further, the check valve 64 may include a resilient member 65 that biases the check valve 64 toward a closed position. Thus, the first inlet port 34 and the first outlet port 40 of the diverter 62 are in fluid communication via the check valve 64.

The relief valve 66 may include a spool 68 that is movably disposed within a valve body 70. As shown in FIG. 2, the relief valve 66 has an inlet port 72 and an exit port 74 defined by the valve body 70, and two orientations of the spool 68 relative to the valve body 70 define a first valve position and a second valve position, respectively. However, it will be appreciated that the relief valve 66 could include any number of connection ports greater than one and effect any number of positions greater than one.

Further according to FIG. 2, the relief valve 66 is fluidly coupled to the second supply conduit 38 and the second outlet conduit 46 via its inlet port 72 and exit port 74, respectively. The spool 68 and valve body 70 define a first internal channel 76 and a blocking channel 78 therebetween. When the spool 68 is oriented in a first position relative to the valve body 70, fluid communication between the second supply conduit 38 and the second outlet conduit 46 may be blocked by the blocking channel 78. And when the spool 68 is oriented in a second position relative to the valve body 70, the second supply conduit 38 and the second outlet conduit 46 may be in fluid communication via the first internal channel 76.

The relief valve 66 may include a resilient member 80 that biases the spool 68 toward the first position relative to the valve body 70, which blocks fluid communication between the second supply conduit 38 and the second outlet conduit 46. Further, the relief valve 66 may include an actuator 82 that urges the spool 68 toward the second position relative to the valve body 70. Accordingly, a position of the spool 68 relative to the valve body 70 may be determined by a balance of forces acting on the spool 68 between the resilient member 80 and the actuator 82. Although only one resilient member 80 and one actuator 82 are shown in FIG. 2, it will be appreciated that any number of resilient members or actuators could be incorporated into the relief valve 66 in various arrangements.

The actuator 82 may be a hydraulic actuator in fluid communication with the first supply conduit 30 via the second inlet conduit 50, such that hydraulic pressure in the actuator 82 bears on a piston face of the spool 68, thereby urging the spool 68 toward its second position with respect to the valve body 70. Accordingly, the diverter 62 may control a fluid pressure in the first supply conduit 30 based on a pressure within the diverter 62.

Alternatively, the actuator 82 may be an electrically actuated solenoid coupled to the spool 68, such that energizing the solenoid urges the spool 68 toward its second position with respect to the valve body 70. It will be appreciated that a solenoid actuator could be controlled by an electronic control module (not shown), or the like, based on measurements within the hydraulic system 60, such as, for example, a fluid pressure in the hydraulic system 60 or other measurement indicative of hydraulic flow demand of the machine 15. Accordingly, the diverter 62 may control a fluid pressure in the first supply conduit 30 based on a signal from an electronic control module (see FIG. 4, e.g.).

In one aspect of the disclosure, the actuator 82 may toggle the spool 68 between its first position and second position relative to the valve body 70. In another aspect of the disclosure, the actuator 82 may proportionally control a location of the spool 68 relative to the valve body 70.

Figure 3:
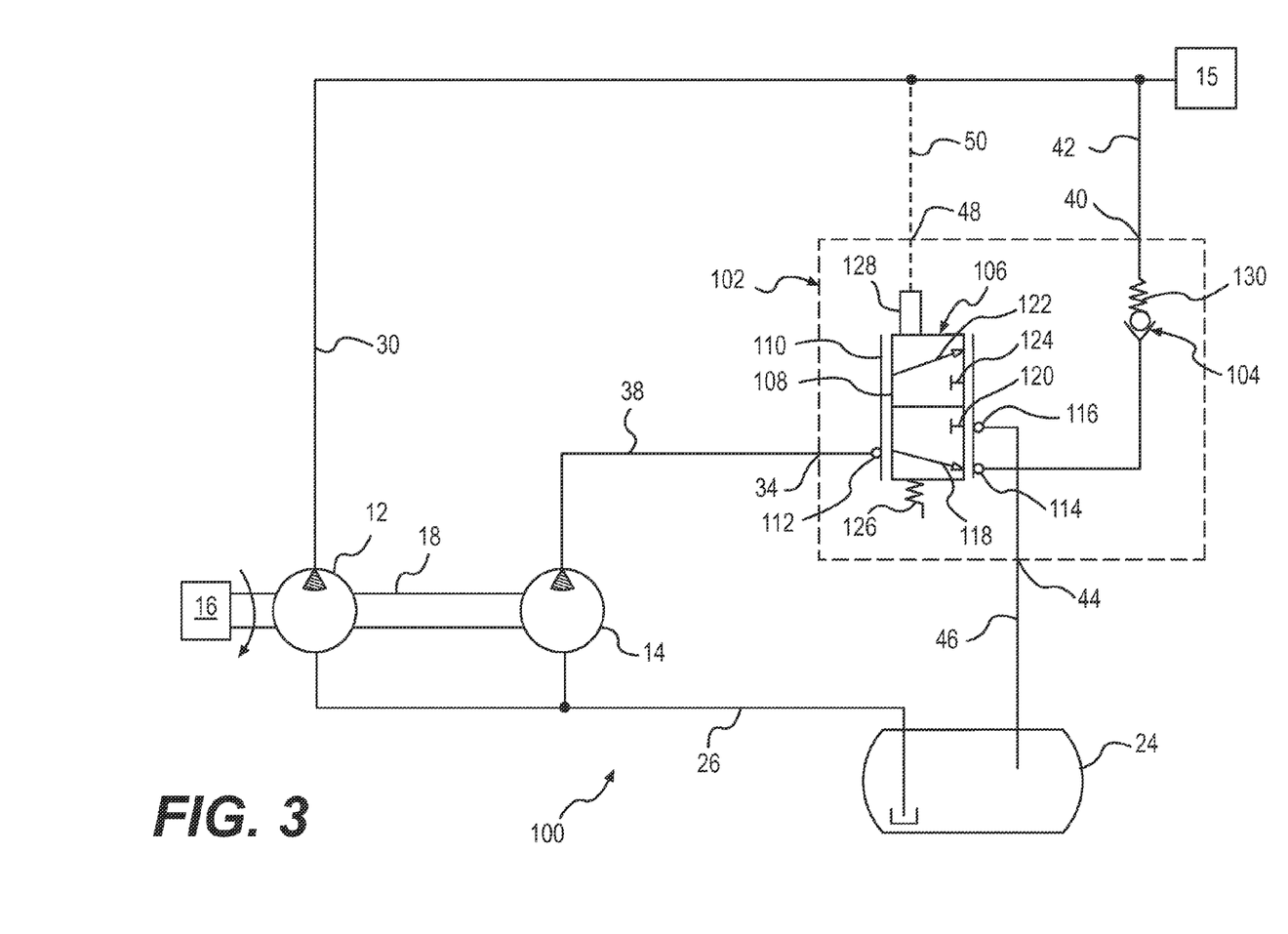
FIG. 3 is a schematic diagram of a hydraulic system according to an aspect of the disclosure.

FIG. 3 is a schematic diagram of a hydraulic system 100 according to an aspect of the disclosure. Similar to FIG. 1, the hydraulic system 100 includes a first pump 12 and a second pump 14 to draw hydraulic fluid from a reservoir 24 and deliver the hydraulic fluid to a machine 15 via a first supply conduit 30. However, the hydraulic system 100 further includes a diverter 102 having a check valve 104 and a relief valve 106.

The relief valve 106 may include a spool 108 that is movably disposed within a valve body 110. As shown in FIG. 3, the relief valve 106 has an inlet port 112, a first exit port 114, and a second exit port 116 defined by the valve body 110, and two orientations of the spool 108 relative to the valve body 110 define a first valve position and a second valve position, respectively. However, it will be appreciated that the relief valve 106 could include any number of connection ports greater than two and effect any number of positions greater than one.

Further according to FIG. 3, the relief valve 106 is fluidly coupled to the second supply conduit 38, the first outlet conduit 42, and the second outlet conduit 46 via the inlet port 112, the first exit port 114, and the second exit port 116, respectively. The spool 108 and the valve body 110 define a first internal passage 118, a first blocking passage 120, a second internal passage 122, and a second blocking passage 124, therebetween.

When the spool 108 is oriented in a first position relative to the valve body 110, fluid communication between the second supply conduit 38 and the second outlet conduit 46 may be blocked by the blocking channel 120, and the second supply conduit 38 may be in fluid communication with the first outlet conduit 42 via the first internal passage 118. And when the spool 108 is oriented in a second position relative to the valve body 110, the second supply conduit 38 may be in fluid communication with the second outlet conduit 46 via the second internal passage 122, and fluid communication between the second supply conduit 38 and the first outlet conduit 42 may be blocked by the second blocking passage 124.

According to an aspect of the disclosure, the first inlet port 34 of the diverter 102 is not in fluid communication with second outlet port 44 of the diverter 102 when the spool 108 is located in the first position relative to the valve body 110. According to another aspect of the disclosure, the first inlet port 34 of the diverter 102 is not in fluid communication with the first outlet port 40 of the diverter 102 when the spool 108 is located in the second position relative to the valve body 110.

The relief valve 106 may include a resilient member 126 that biases the spool 108 toward the first position relative to the valve body 110. Further, the relief valve 106 may include an actuator 128 that urges the spool 108 toward the second position relative to the valve body 110. Accordingly, a position of the spool 108 relative to the valve body 110 may be determined by a balance of forces acting on the spool 108 between the resilient member 126 and the actuator 128. Although only one resilient member 126 and one actuator 128 are shown in FIG. 3, it will be appreciated that any number of resilient members or actuators could be incorporated into the relief valve 106 in various arrangements.

The actuator 128 may be a hydraulic actuator in fluid communication with the first supply conduit 30 via the second inlet conduit 50, such that hydraulic pressure in the actuator 128 bears on a piston face of the spool 108, thereby urging the spool 108 toward its second position with respect to the valve body 110. Accordingly, the diverter 102 may control a fluid pressure in the first supply conduit 30 based on a pressure within the diverter 102.

Alternatively, the actuator 128 may be an electrically actuated solenoid coupled to the spool 108, such that energizing the solenoid urges the spool 108 toward its second position with respect to the valve body 110. It will be appreciated that a solenoid actuator could be controlled by an electronic control module (not shown), or the like, based on measurements within the hydraulic system 100, such as, for example, a fluid pressure in the hydraulic system or other measurement indicative of hydraulic flow demand of the machine 15. Accordingly, the diverter 102 may control a fluid pressure in the first supply conduit 30 based on a signal from an electronic control module (see FIG. 4, e.g.).

In one aspect of the disclosure, the actuator 128 may toggle the spool 108 between its first position and second position relative to the valve body 110. In another aspect of the disclosure, the actuator 128 may proportionally control a location of the spool 108 relative to the valve body 110.

The check valve 104 may be disposed in the first outlet conduit 42 extending between the first exit port 114 of the relief valve 106 and the first supply conduit 30, and effect fluid communication therebetween. The check valve 104 is oriented such that it allows flow only in a direction from the relief valve 106 toward the first supply conduit 30. Further, the check valve 104 may include a resilient member 130 that biases the check valve 104 toward a closed position. Thus, the first inlet port 34 and the first outlet port 40 of the diverter 102 may be in fluid communication via the check valve 104 when the spool 108 is located in its first position relative to the valve body 110.

Figure 4:
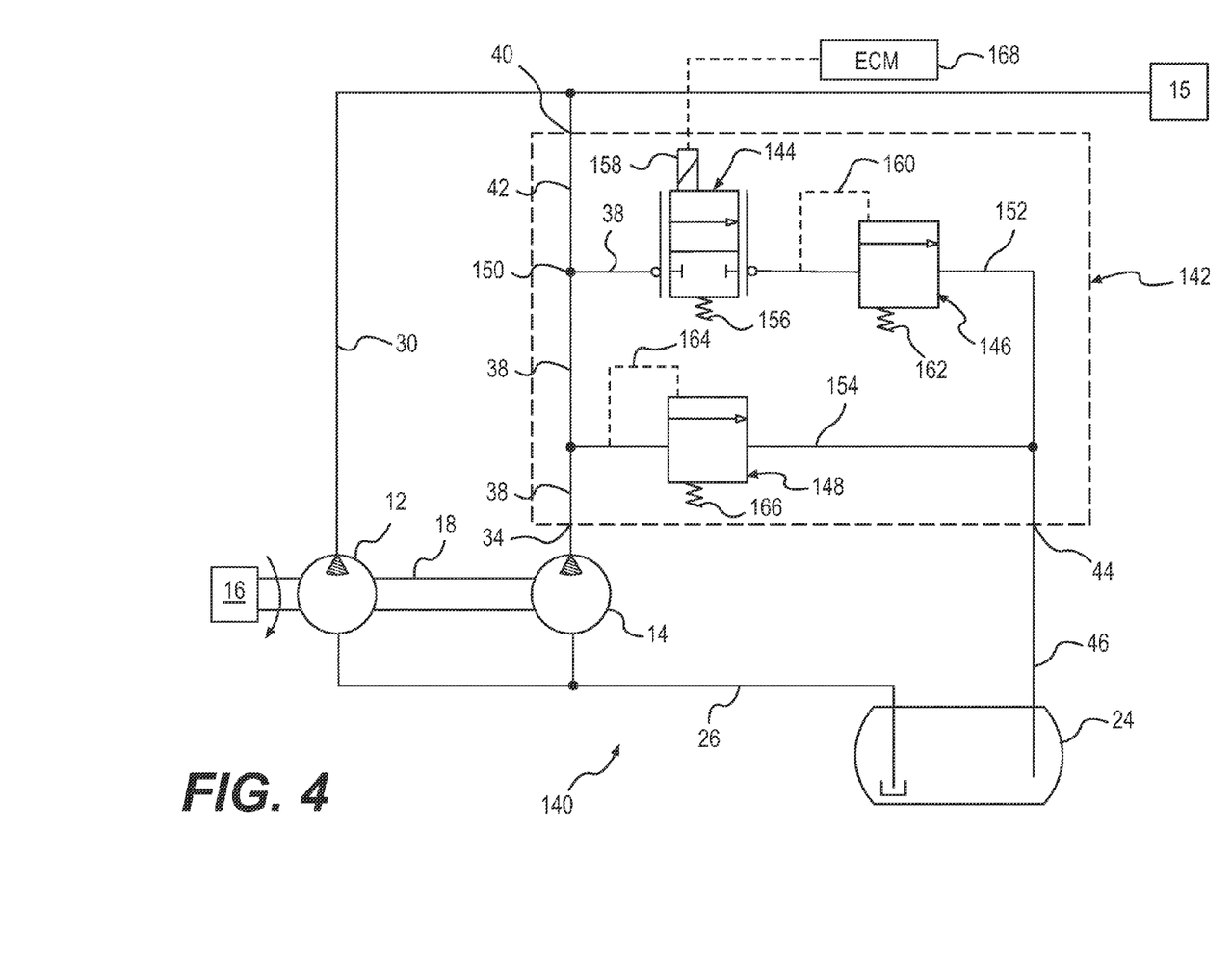
FIG. 4 is a schematic diagram of a hydraulic system according to an aspect of the disclosure.

FIG. 4 is a schematic diagram of a hydraulic system 140 according to an aspect of the disclosure. Similar to FIG. 1, the hydraulic system 140 includes a first pump 12 and a second pump 14 to draw hydraulic fluid from a reservoir 24 and deliver the hydraulic fluid to a machine 15 via a first supply conduit 30. However, the hydraulic system 140 further includes a diverter 142 having a solenoid valve 144, a first relief valve 146, and a second relief valve 148.

As shown in FIG. 4, the second supply conduit 38 may be fluidly coupled to the first outlet conduit 42 at a node 150. Thus, the first inlet port 34 is in fluid communication with the first outlet port 40 via the node 150. The second supply conduit 38 may be in fluid communication with the second outlet conduit 46 via a first relief conduit 152 and a second relief conduit 154, as next discussed.

The solenoid valve 144 and the first relief valve 146 are disposed in the first relief conduit 152, where the solenoid valve 144 is arranged upstream of the first relief valve 146 in a direction of flow through the first relief conduit 152. The solenoid valve 144 is operable between a first position that blocks fluid communication between the second supply conduit 38 and the first relief valve 146, and a second position that effects fluid communication between the second supply conduit 38 and the first relief valve 146. The solenoid valve 144 may include a resilient member 156 that biases the solenoid valve 144 toward its closed/first position. Further, the solenoid valve 144 includes a solenoid actuator 158 that may urge the solenoid valve 144 toward its open/second position when the solenoid actuator 158 is energized. Alternatively, it will be appreciated that the solenoid valve 144 could be normally open, where the solenoid actuator 158 urges the solenoid valve 144 toward its closed/first position when energized.

An electronic control module 168 is operatively coupled to the solenoid actuator 158 of the solenoid valve 144 and may energize the solenoid actuator 158 based on a state of the hydraulic system 140, such as, for example a fluid pressure in the hydraulic system 140, a state of hydraulic actuator operation of the machine 15, a state of a prime mover within the machine 15, or a mode of operation based on, for example, elapsed time between user inputs to the machine 15.

The first relief valve 146 is fluidly coupled to an outlet of the solenoid valve 144 and is operable to effect fluid communication between the solenoid valve 144 and the second outlet conduit 46 when a pressure in the first pilot conduit 160 overcomes the force of a resilient member 162. The pressure in the first pilot conduit 160 that causes the first relief valve 146 to open may be called a pressure setpoint of the first relief valve 146. Thus, the second supply conduit 38 is in fluid communication with the second outlet conduit 46 when the solenoid valve 144 is configured in an open/second position and a pressure in the first pilot conduit 160 exceeds a pressure setpoint of the first relief valve 146.

The second relief valve 148 is disposed in the second relief conduit 154 to effect fluid communication between the second supply conduit 38 and the second outlet conduit 46 when a pressure in the second pilot conduit 164 overcomes the force of a resilient member 166. The pressure in the second pilot conduit 164 that causes the second relief valve 148 to open may be called a pressure setpoint of the second relief valve 148. Thus, the second supply conduit 38 is in fluid communication with the second outlet conduit 46 when a pressure in the second pilot conduit 164 exceeds a pressure setpoint of the second relief valve 148.

In one aspect of the disclosure the pressure setpoint of the second relief valve 148 is greater than a pressure setpoint of the first relief valve 146. In turn, the second relief valve 148 may act to increase pressure in the hydraulic system 140 when the solenoid valve 144 is in the closed/first position, and the first relief valve 146 may act to reduce pressure in the hydraulic system 140 when the solenoid valve 144 is in the open/second position. Therefore, the electronic control module 168 may selectively effect a lower pressure in the first supply conduit 30 by actuating the solenoid valve 144 into its open/second position.

Although FIG. 4 shows two pumps 12, 14, it will be appreciated that the diverter 142 could be used to control the pressure of a hydraulic system 140 that includes only one boost pump. Further, although FIG. 4 shows a hydraulic system 140 with valve 144 controlled by a solenoid actuator 158, it will be appreciated that either a hydraulic actuator or a mechanical actuator could replace the solenoid actuator 158 to effect operation the same as or similar to that discussed above.

Figure 5:
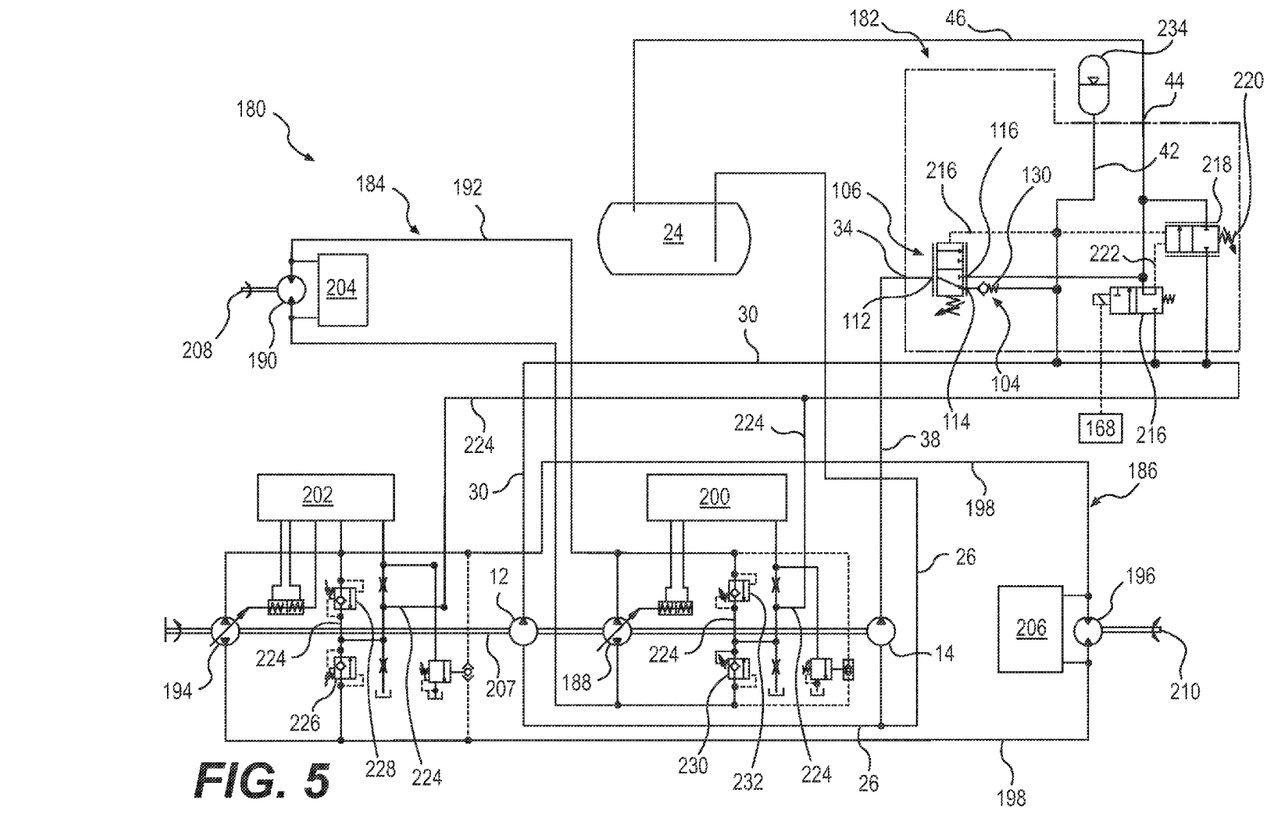
FIG. 5 is a schematic diagram of a hydraulic system according to an aspect of the disclosure.

FIG. 5 is a schematic diagram of a hydraulic system 180 according to an aspect of the disclosure. Similar to FIG. 1, the hydraulic system 180 includes a first pump 12 and a second pump 14 to draw hydraulic fluid from a reservoir 24. However, the hydraulic system 180 may further include a diverter 182, a first hydrostatic closed-loop system 184, and a second hydrostatic closed-loop system 186. Although FIG. 5 shows two hydrostatic closed-loop systems 184, 186, it will be appreciated that the hydraulic system 180 could include any number of hydrostatic closed-loop systems.

The first hydrostatic closed-loop system 184 includes a third pump 188 fluidly coupled to a first hydraulic motor 190 via a first closed-loop conduit 192, and the second hydrostatic closed-loop system 186 includes a fourth pump 194 fluidly coupled to a second hydraulic motor 196 via a second closed-loop conduit 198. The third pump 188 and the fourth 194 pump may be variable displacement pumps that are controlled by a first pump controller 200 and a second pump controller 202, respectively. Further, the first closed-loop conduit 192 and the second closed-loop conduit 198 may be fluidly coupled to a first flushing system 204 and a second flushing system 206, respectively.

As shown in FIG. 5, the first pump 12, the second pump 14, the third pump 188, and the fourth pump 194 are all driven by a common shaft 207. However, it will be appreciated that the first pump 12, the second pump 14, the third pump 188, and the fourth pump 194 could be driven by any number of shafts ranging from one to four, which correspond to any number of prime movers coupled to the pumps through the shafts.

The first hydraulic motor 190 and the second hydraulic motor 196 may be coupled to a first output shaft 208 and a second output shaft 210, respectively. Either of the first output shaft 208 or the second output shaft 210 may be coupled to a work implement such as a drive wheel of a vehicle, a steering system of a vehicle, a fan, or any other work implement known to persons having ordinary skill in the art. It will be appreciated that the first and second hydrostatic closed-loop systems 184, 186 may be reversible, such that either the first hydraulic motor 190 or the second hydraulic motor 196 may be operated in a forward direction or a reverse direction.

Similar to the diverter 102 discussed with respect to FIG. 3, the diverter 182 includes a relief valve 106 having an inlet port 112 fluidly coupled to the second supply conduit 38, a first exit port 114 fluidly coupled to the first supply conduit 30 via a check valve 104, and a second exit port 116 fluidly coupled to the second outlet conduit 46. Thus, when the relief valve 106 is in an open/first position, the second supply conduit 38 is in fluid communication with the first supply conduit 30 via the relief valve 106 and the first outlet conduit 42. And when the relief valve 106 is in a second/closed position, the second supply conduit 38 is in fluid communication with the second outlet conduit 46 via the relief valve 106.

Accordingly, the diverter 182 may combine the discharge flow from the second pump 14, or a fraction thereof, with the discharge flow from the first pump 12 to increase a pressure in the first supply conduit 30. Else, the diverter 182 may also direct the discharge flow from the second pump 14, or a fraction thereof, to the reservoir 24 via the second outlet conduit 46 to decrease a pressure in the first supply conduit 30.

Optionally, the diverter 182 may include a low pressure pilot valve 216 fluidly coupled to a charge relief valve 218. The charge relief valve 218 may block fluid communication between the first supply conduit 30 and the reservoir 24 via the charge relief valve 218 when the charge relief valve 218 is in a first/closed position. Else, the charge relief valve 218 may effect fluid communication between the first supply conduit 30 and the reservoir 24 via the charge relief valve 218 when the charge relief valve 218 is in a second/open position.

The charge relief valve 218 may include a resilient member 220 that biases the orientation of the charge relief valve 218 toward the first/closed position. Further, the charge relief valve 218 may receive two hydraulic inputs from pilot conduit 222 and pilot conduit 223 in opposition to the resilient member 220.

When the low pressure pilot valve 216 is in a non-energized state, the low pressure pilot valve 216 may vent the pilot conduit 222 to the reservoir 24, such that the pressure in the pilot conduit 223 is the only hydraulic pressure opposing the resilient member 220. When the electronic control module 168 energizes the low pressure pilot valve 216, pressure from the first supply conduit 30 is applied to pilot conduit 222, such that the pressures in both the pilot conduit 222 and pilot conduit 223 may act on the charge relief valve in opposition to the resilient member 220. Thus, when the low pressure pilot valve 216 is not energized, the charge relief valve 218 may vent hydraulic pressure at a first pressure setpoint, and when the low pressure pilot valve 216 is in an energized state, the charge relief valve 218 may open further to vent hydraulic pressure down to a second, lower pressure setpoint.

The electronic control module 168 can be configured to energize the low pressure pilot valve 216 upon detecting a low demand for hydraulic fluid charge or boost pressure within the hydraulic system 180, such as, for example, an idle state of an engine, an idle state of one or more hydraulic actuators, a hydraulic fluid pressure, a time delay between control inputs to the machine 15, combinations thereof, or any other indicator of low boost flow demand known to persons having ordinary skill in the art.

Downstream of the diverter 182, flow from the first pump 12 and a fraction of the flow from the second pump 14 determined by the diverter 182 (ranging from 0 to 100%) may replenish hydrostatic fluid to either the first hydrostatic closed-loop system 184 or the second hydrostatic closed-loop system 186 via the boost conduit 224. The boost conduit 224 may deliver hydraulic fluid to the first closed-loop conduit 192 via one of the crossover relief valves 226, 228, or deliver hydraulic fluid to the second closed-loop conduit 198 via one of the crossover relief valves 230, 232.

Optionally, the diverter 182 may include an accumulator 234 in fluid communication with the first supply conduit 30, the second supply conduit 38, or both. The accumulator 234 may act to filter or damp pressure oscillations within the diverter 182.

INDUSTRIAL APPLICABILITY

The present disclosure is universally applicable to hydraulic systems in general, such as, for example, boost or charge systems for hydrostatic closed-loop circuits, hydraulic circuits for actuating work implements such as hydraulic cylinders or hydraulic motors, hydraulic pilot circuits for effecting control functions, or other hydraulic circuits known to persons with ordinary skill in the art. As discussed previously with respect to FIGS. 1-5, a diverter according to aspects of the disclosure may be employed to selectively combine the discharge flow from a first hydraulic pump 12 and a second hydraulic pump 14, where both pumps may have fixed displacement, to optimize hydraulic operation of a machine 15.

Excess flow of boost or charge fluid from either the first pump 12 or the second pump 14 may be bled through relief valves back to the reservoir 24. The power lost by bleeding excess hydraulic fluid is proportional to both the flow rate of the fluid bled and the pressure rise across the pump generating the excess fluid. In a system with multiple boost pumps having fixed displacements, one may not be able to curtail the amount of excess hydraulic fluid flow because the total flow is set by the speeds of the pumps and the fixed displacements of the pumps. Further, the pump speeds may be set by criteria other than boost system energy efficiency. However, one may still be able to save energy during periods of low boost flow demand by decreasing the pressure rise across the boost pumps.

The pressure rise across the boost pumps may be decreased by decreasing the fluid resistance downstream of the pumps. As previously discussed, a diverter (36, 62, 102, 142, or 182 in FIGS. 1-5, respectively) according to aspects of the disclosure may reduce the fluid resistance downstream of the first pump 12 and the second pump 14 by opening fluid communication between the discharge 32 of the second pump 14 and the reservoir 24, thereby reducing the energy lost by production of excess boost flow.

In an aspect of the disclosure, when the flow from the first pump 12 is sufficient to supply the machine 15, all of the flow from the second pump 14 may be bled directly to the reservoir 24 by the diverter 36 (see FIG. 1). In another aspect of the disclosure when the total combined flow from the first pump 12 and the second pump 14 is necessary to supply the machine 15, then none of the flow from the second pump 14 may be bled to the reservoir 24 by the diverter 36 (see FIG. 1). In yet another aspect of the disclosure, the diverter 36 may only bleed a portion of the flow from the second pump 14 to the reservoir 24.

In an aspect of the disclosure, the first pump 12 is integrated into a left-side track propulsion pump of the machine 15 and the second pump 14 is integrated into a right-side track propulsion pump of the machine 15. In another aspect of the disclosure, the first pump 12 is a primary boost pump that has a larger fixed displacement than a fixed displacement of the second pump 14.

Therefore, unlike conventional approaches, aspects of the disclosure may enable a hydraulic system to benefit from the low cost and small size associated with multiple fixed displacement boost pumps, while still enabling control over boost system energy efficiency as a function of boost flow demand.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hydrostatic closed-loop system, comprising:
   a first pump having a first fixed displacement;
   a second pump having a second fixed displacement;
   a third pump coupled a hydraulic motor via a hydrostatic closed-loop conduit; and
   a diverter including
      a first diverter inlet port fluidly coupled to a discharge of the second pump,
      a first diverter outlet port fluidly coupled to a discharge of the first pump, and
      a second diverter outlet port fluidly coupled to a low pressure system, the low pressure system having a fluid pressure lower than a fluid pressure of the discharge of the first pump,
   the diverter being operable to selectively vary fluid communication between the first diverter inlet port and either the first diverter outlet port or the second diverter outlet port based on a reference pressure, the reference pressure being a fluid pressure in a conduit downstream of the discharge of the first pump, such that the diverter effects fluid communication between the first diverter inlet port and the second diverter outlet port when the reference pressure is greater than a first pressure setpoint.

2. The hydrostatic closed-loop system of claim 1, wherein the first diverter outlet port is fluidly coupled to the hydrostatic closed-loop conduit.

3. The hydrostatic closed-loop system of claim 2, wherein the first diverter outlet port is fluidly coupled to the hydrostatic closed-loop conduit via at least one crossover relief valve.

4. The hydrostatic closed-loop system of claim 1, wherein the low pressure system is a reservoir in fluid communication with at least one of either an inlet of the first pump, and an inlet of the second pump.

* * * * *